Aug. 14, 1934.  J. W. STEVENSON  1,969,994
UNSTACKER
Filed Nov. 5, 1932   6 Sheets-Sheet 2

INVENTOR
JAMES W. STEVENSON
BY
ATTORNEY

Aug. 14, 1934.　　J. W. STEVENSON　　1,969,994
UNSTACKER
Filed Nov. 5, 1932　　6 Sheets-Sheet 6

INVENTOR
JAMES W. STEVENSON
BY
ATTORNEY

Patented Aug. 14, 1934

1,969,994

UNITED STATES PATENT OFFICE 1,969,994

UNSTACKER

James W. Stevenson, Riverside, Calif.

Application November 5, 1932, Serial No. 641,351

2 Claims. (Cl. 198—35)

My invention relates to box handling machinery, and more particularly to machines for breaking down or unstacking stacks of boxes.

While useful in many industries, my invention will be described herein in connection with its utility in the citrus industry where the fruit is brought from the groves to the packing houses in boxes and is stored in these boxes until convenient to run this fruit through the process of washing, grading, and packing by which the fruit is prepared for market. In the case of lemons the fruit is picked green and after being washed and sorted according to color is stored in the basement in shipping boxes for a number of weeks to permit the fruit to ripen. After the lemons have been stored a proper length of time in the basement they are elevated on a separate box elevator to the main floor of the building where they are discharged onto a horizontal conveyor which delivers the boxes of fruit to the sorting tables where the fruit is again sorted over for grade and thereafter sorted for size, wrapped, and placed in shipping cases.

Hitherto it has been necessary to feed the vertical elevators, lifting the boxes of fruit from the basement to the main floor, by hand and this has required the manual breaking down of the stacks of fruit in the basement which is an exceedingly arduous job and an expensive step in the packing process owing to the number of men required to be kept on this task throughout the working day.

It is accordingly an object of my invention to eliminate the necessity of manually breaking down stacks of boxes in feeding these to vertical elevators.

In the handling of oranges and grapefruit vertical elevators are also used to lift the field boxes loaded with fruit from the basement to the first floor where they are dumped in the first step of passing the fruit through the packing process. It is thus seen that the same problem is to be met with in the handling of oranges and grapefruit as is met with in the handling of lemons, as above described.

In some of the vertical box elevators it is necessary to feed the box through the elevator with a longitudinal movement of the box.

It is another object of my invention to provide means for breaking down stacks of boxes and feeding the boxes individually in a longitudinal direction into a vertical elevator.

Referring specifically to the drawings, an unstacking machine 10, comprising a preferred embodiment of my invention, is shown in the several views of the drawings, this machine including a suitable frame 11, a stack delivery conveyor 12, a stack elevator 13, an idle transfer conveyor 14, a power driven transfer conveyor 15, a suitable power transmitting apparatus 16, and a separate box elevator 17.

The frame 11

Figure 2:
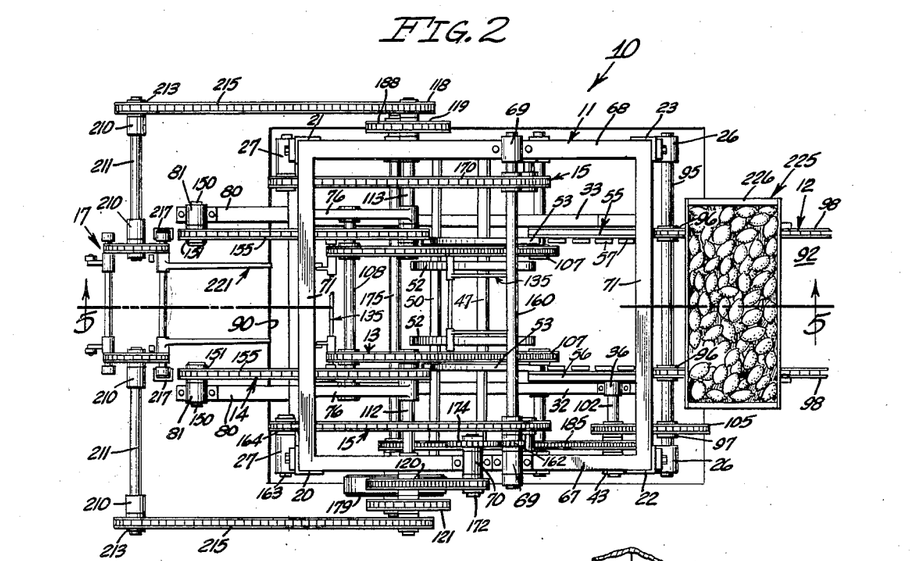
Fig. 2 is a top plan view of the machine shown in Fig. 1.
Figure 7:
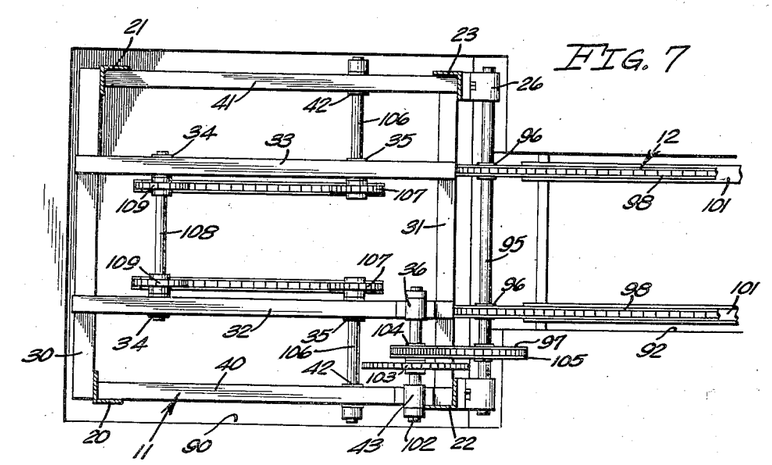
Fig. 7 is a horizontal sectional view taken on the line 7—7 of Fig. 1.

The frame 11 includes four vertical corner standards 20, 21, 22, and 23, as shown in Figs. 2 and 7, these standards being preferably made of angle iron as shown. Secured to lower portions of the standards 22 and 23 are horizontally aligned bearings 26, the purpose of which will be made clear hereinafter in connection with the stack delivery conveyor 12. Mounted on upper portions of the standards 20 and 21 are horizontally aligned bearings 27, these being hereinafter referred to in connection with the power driven transfer conveyor 15.

Figure 1:
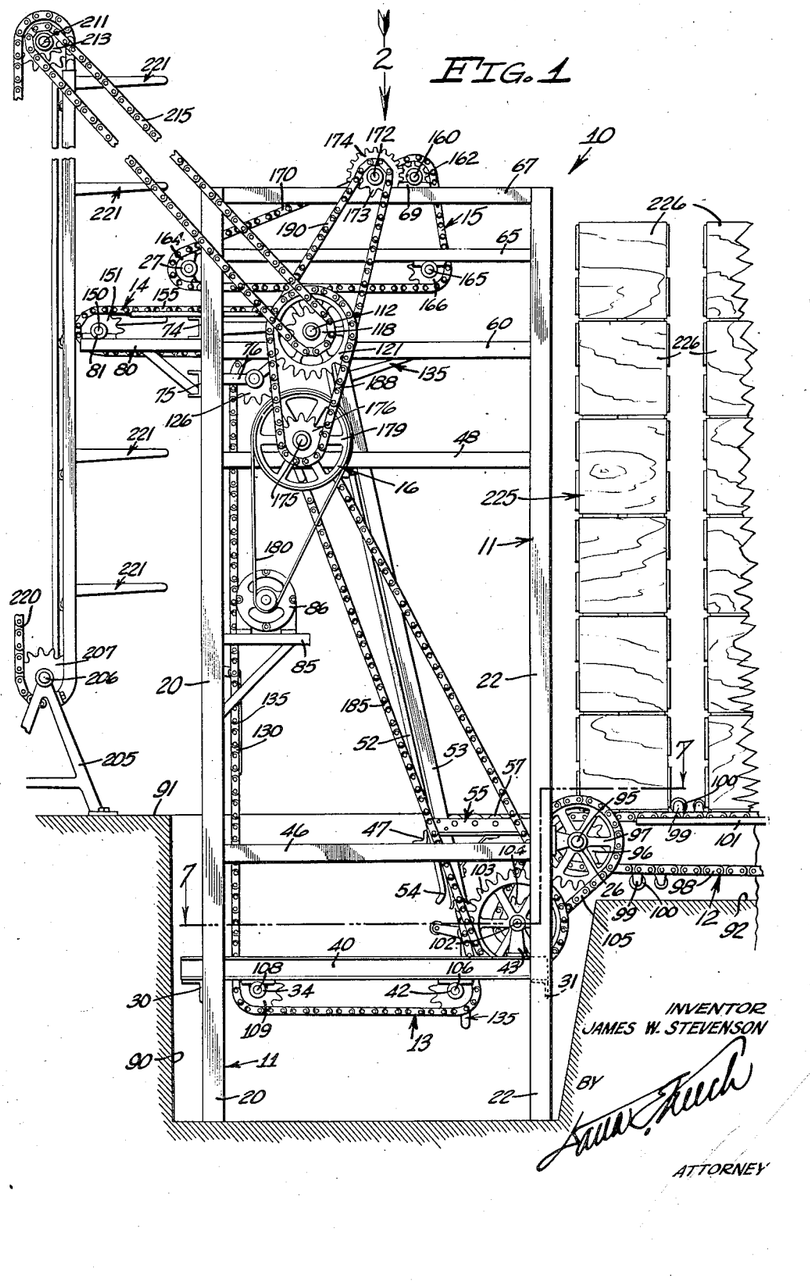
Fig. 1 is a side elevational view of a preferred embodiment of my invention.

Bolted to lower portions of the standards 20 and 21 is a horizontal angle iron bar 30 shown in Figs. 1 and 7. Secured to the standards 22 and 23 in horizontal alignment with the angle iron bar 30 is a similar bar 31, the bars 30 and 31 supporting opposite ends of a pair of channel bars 32 and 33 (see Fig. 7). Fixed to the under sides of the channel bars 32 and 33 are pairs of aligned bearing blocks 34 and 35, a single bearing standard 36 being mounted on the upper side of the channel bar 32, as shown. Mounted on the corner standards 20, 22, 21, and 23 in parallel horizontally aligned relation with the aforementioned channel bars 32 and 33 are channel bars 40 and 41, as shown in Fig. 7, these having bearing blocks 42 bolted to the under sides thereof, it being noted that the bearings 42 are disposed in axial alignment with the aforementioned bearings 35 on the channel bars 32 and 33. Mounted on the upper side of the channel bar 40 is a bearing 43 disposed in axial alignment with the bearing 36 of the bar 32.

Fixed to the standards 20, 22, and to the standards 21 and 23 are horizontal angle bars 46, as shown in Fig. 1. The purpose of the bars 46 is to support opposite ends of a horizontal bar 47. Secured to the standards 20, 22, and to the standards 21 and 23 above the angle bars 46 is another pair of angle bars 48, the latter having a pair of aligned bearing blocks 49 fixed to the upper sides thereof and a bar 50 fixed to the under sides thereof, it being noted in Fig. 1 that the bar 50 and the aforementioned bar 47 are positioned in parallel relation.

Supported by the parallel bars 47 and 50 is a pair of inclined bars 52 and a pair of channel iron members 53, as shown in Figs. 3, 4, 6, and 8. The lower ends of the bars 52 are curved as indicated at 54 in Fig. 8, it also being noted in this figure that the lower ends of the side walls of the channel bars 53 are flared as shown. The purpose of the inclined bars 52 and channel iron members 53 will be made manifest hereinafter in a description of the stack elevator 13.

Figure 8:
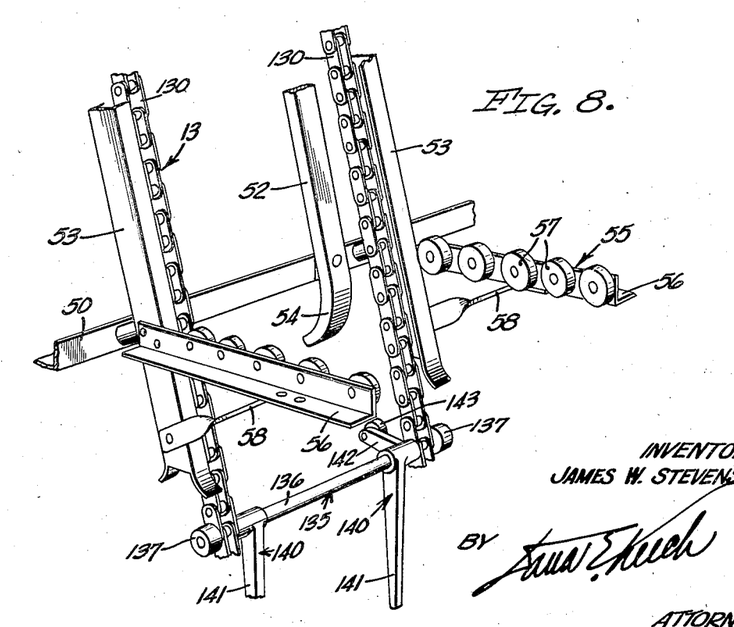
Fig. 8 is a fragmentary perspective view of a portion of the preferred embodiment of my invention.

Fixed to the lower ends of the channel iron members 53, as shown in Fig. 8, is a stack receiving platform 55 which includes parallel horizontal angle iron bars 56, the latter having rollers 57 mounted thereon. The bars 56 are rigidly supported by diagonal brace members 58.

Fastened to the standards 20, 22, 21, and 23 in vertical spaced relation with the angle bars 48 is another pair of angle bars 60, the latter having aligned bearing blocks 61 mounted thereon, as shown in Fig. 2. Secured to the standards 20, 22, 21, and 23 above the angle bars 60 is still another pair of angle bars 65. Fixed to the under sides of the bars 65 is a pair of aligned bearings 66, the latter being disposed in horizontal alignment with the hereinbefore mentioned bearings 27 of the standards 20 and 21, as shown in Fig. 1.

Figure 6:
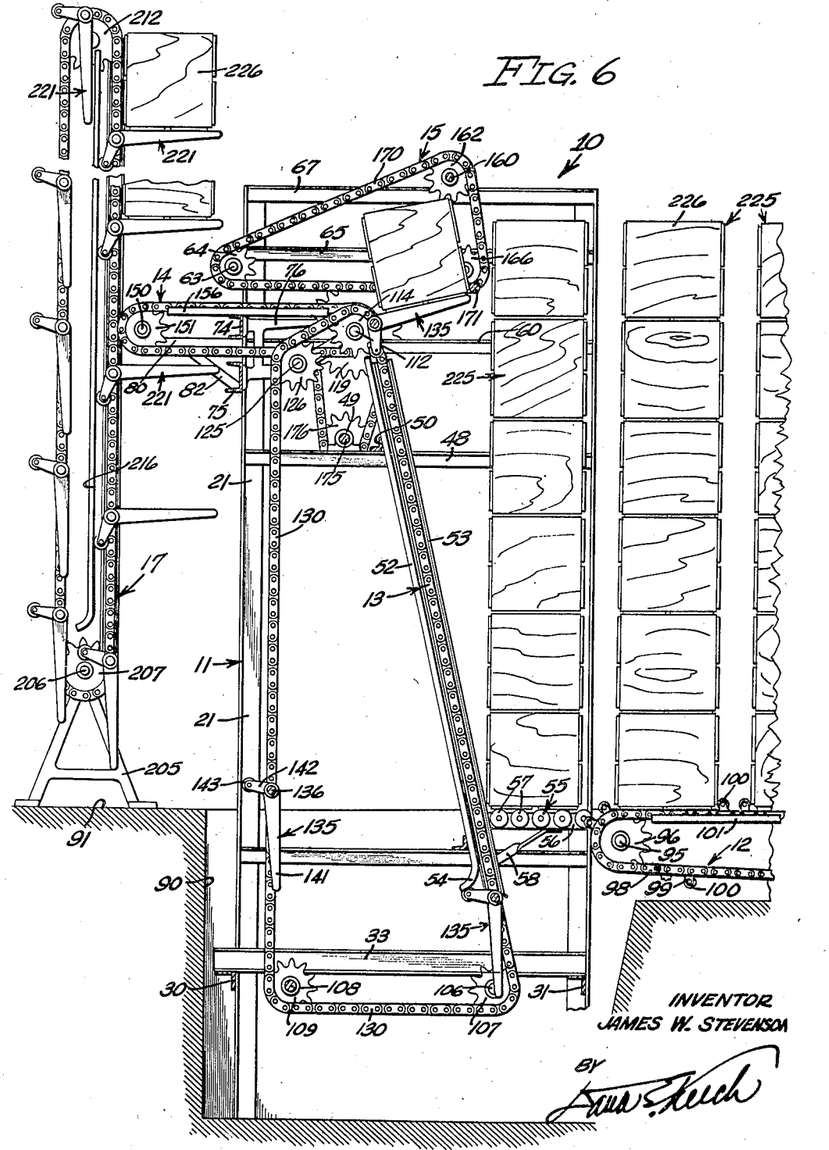
Fig. 6 is a view similar to Fig. 5 but showing another stage of operation.

The upper ends of the standards 20 and 22 are fixed to opposite ends of a horizontal angle iron bar 67 and opposite ends of a similar and parallel angle bar 68 are fixed to upper ends of the standards 21 and 23, as shown in Fig. 2. Mounted on top of the uppermost bars 67 and 68 are horizontally aligned bearings 69. Also mounted on the angle bar 67 adjacent the bearing 69 of this bar is a bearing 70. The purpose of the bearings 69 and 70 will be made clear hereinafter relative to the power driven transfer conveyor 15. Fixed to the upper ends of the standards 20 and 21 and the standards 22 and 23, as shown in Figs. 2 and 6, are horizontal angle bars 71 disposed in horizontal alignment with the bars 67 and 68.

Figures 3, 4:
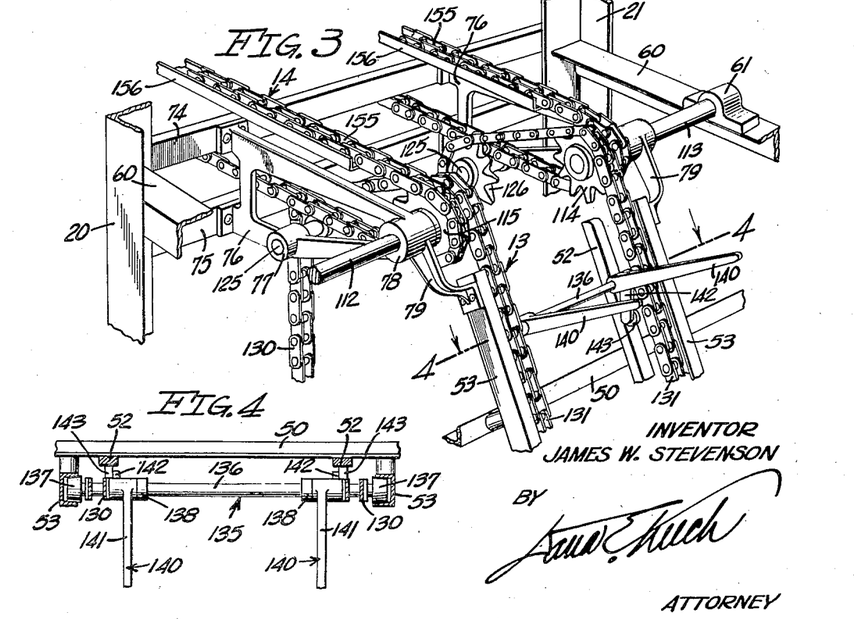
Fig. 3 is a fragmentary perspective view of an upper portion of the machine shown in Figs. 1 and 2.
Fig. 4 is a fragmentary cross-sectional view taken on the line 4—4 of Fig. 3.

Secured to the corner standards 20 and 21, as shown in Figs. 1, 2, and 3, are upper and lower horizontal channel bars 74 and 75. Mounted on the bars 74 and 75 and extending inwardly therefrom are substantially identical bearing brackets 76, the latter having axially aligned apertured hubs 77 and bearings 78 formed integral therewith. It will be noted in Figs. 2 and 3 that the bearings 78 of the brackets 76 are disposed in alignment with the aforementioned bearings 61 on the angle iron bars 60. Formed integral with the bearings 78 of the brackets 76 are downwardly inclined arms 79, the latter being fixed to upper ends of the aforedescribed inclined channel bars 53, as shown clearly in Fig. 3.

Figure 5:
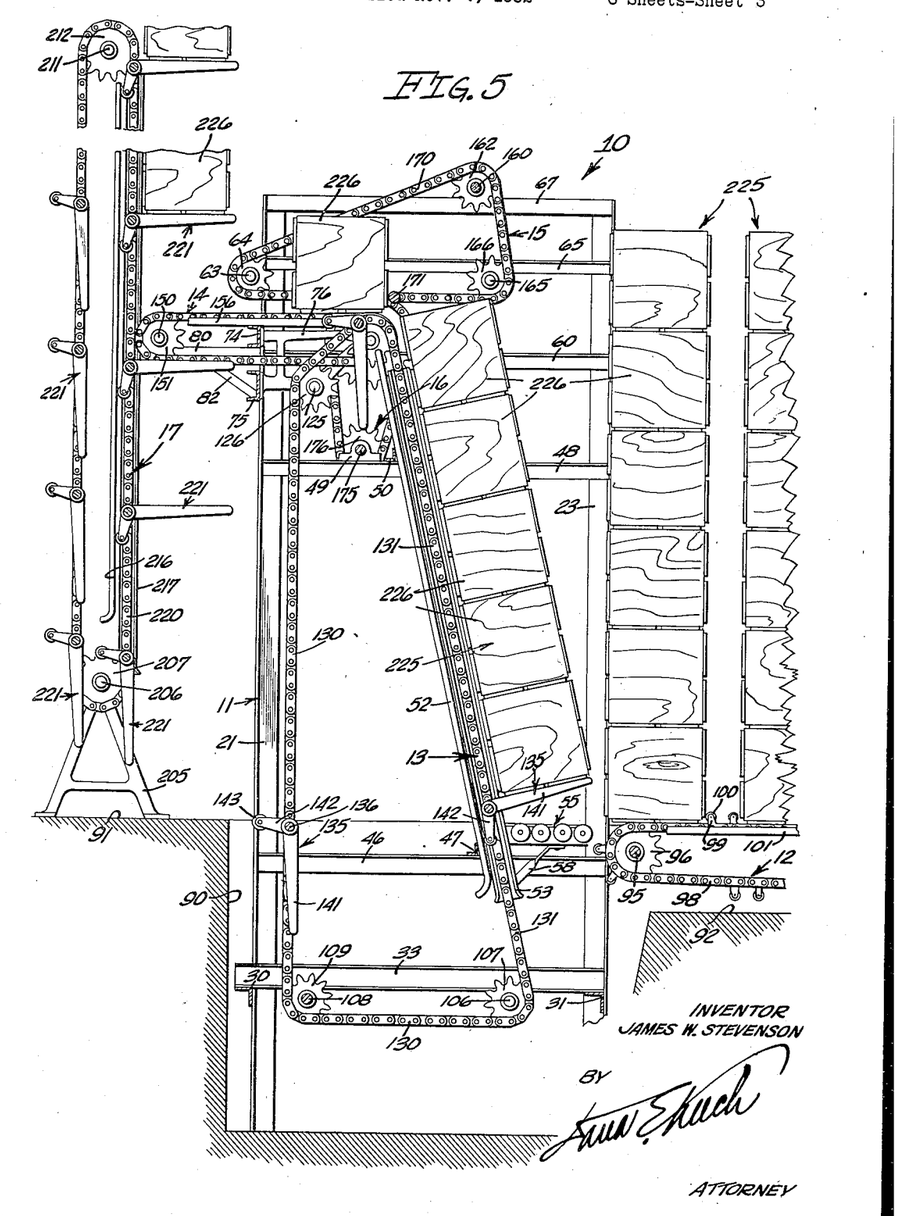
Fig. 5 is a vertical sectional view taken on the line 5—5 of Fig. 4 also showing a stage in the operation of the preferred embodiment of my invention.

Fixed to the under side of the upper channel bar 74, as shown in Figs. 2 and 5, are outwardly extending parallel bars 80, these having apertured blocks 81 fixed thereon. The bars 80 are braced by diagonal members 82, the latter being supported by the lower channel member 75. The purpose of the bars 80 and bearings 81 thereon will become evident in connection with the description of the idle transfer conveyor 14.

Mounted on the corner standard 20, as shown in Fig. 1, is a horizontal bracket 85 upon which a suitable electric motor 86 is mounted. The motor 86 is adapted to drive the machine 10 in a manner to be described hereinafter.

The lower portion of the frame 11 of the machine 10 is adapted to be disposed within a well 90 provided in a packing house floor 91, as shown in Fig. 1. Also provided in the floor 91 in communication with the well 90 is a channel 92, the latter being considerably longer than shown in the drawings.

The stack delivery conveyor 12

Journalled in the bearings 26 of the standards 22 and 23 is a shaft 95 to which a pair of identical sprockets 96 is fixed, as shown in Figs. 1, 2, and 7. Also fixed to the shaft 95 adjacent one of the bearings 26 is a relatively large sprocket wheel 97. Trained about the sprockets 96 and about a pair of identical sprockets (not shown, but which are suitably journalled at the opposite end of the channel 92 in the floor 91) is a pair of endless chains 98, the latter being provided at equally spaced intervals with lugs 99 which have rollers 100 mounted thereon, as shown in Fig. 1. The upper flights of the chains 98 are supported by channel iron tracks 101, the latter being suitably supported within the channel 92. It is noted in Fig. 1 that the upper flights of the chains 98 are disposed in horizontal alignment with the floor 91, and the hereinbefore described stack receiving platform 55.

Journalled in the aforementioned bearings 36 and 43 of the channel bars 32 and 40, respectively, as shown in Fig. 7, is a shaft 102 to which large and small sprocket wheels 103 and 104, respectively, are fixed. Rotation of the shaft 102 is transmitted to the shaft 95 of the stack delivery conveyor 12 by a chain 105, the latter being trained about the sprockets 97 and 104 as shown.

The stack elevator 13

Journalled in the aforementioned bearings 42 and 35, as shown in Fig. 7, is a pair of relatively short shafts 106, to the inner ends of which sprockets 107 are fixed. Rotatable within the bearings 34 of the channel bars 32 and 33 is a shaft 108, the latter being parallel with the shafts 106. Fixed to the shaft 108 in radial alignment with the sprockets 107 is a pair of sprockets 109, shown clearly in Fig. 7.

Journalled in the bearings 61 of the horizontal angle bars 60, and in the bearings 78 of the brackets 76 are shafts 112 and 113, as shown in Figs. 2 and 3. Fixed to the inner extremities of the shafts 112 and 113 are sprockets 114, the latter being positioned in radial alignment with the aforedescribed sprockets 107 and 109 of the shafts 106 and 108, respectively. Adapted to idle on the shafts 112 and 113 between the sprockets 114 and bearings 78, as shown in Figs. 2 and 3, are sprockets 115. These are slightly larger than the adjacent sprockets 114 and will be further described hereinafter in connection with the idle transfer conveyor 14. Fixed to outer extremities of the shafts 112 and 113 are small sprocket wheels 118, the shaft 113 having a relatively large sprocket wheel 119 fixed thereon between the bearing 61 and sprocket 118 as shown. The shaft 112 is slightly longer than the shaft 113 so as to accommodate a pair of large sprocket wheels 120 and 121, the latter being equal in diameter to the sprocket wheel 119 of the shaft 113, as shown in Fig. 2.

Pressed into the hubs 77 of the brackets 76 are short inwardly extending stub shafts 125 upon which idle sprockets 126 are rotatably mounted, the latter being disposed in radial alignment with the sprockets 114 of the shafts 112 and 113, as shown in Figs. 2 and 3.

Trained about the sprockets 107, 109, 114, and 126, as shown in Figs. 2, 5, and 6, is a pair of identical endless chains 130, the inclined flights 131 of the latter extending from the sprockets 107 up to the sprockets 114 in parallel relation with the inclined bars 52 and channels 53, as shown in Figs. 3 and 8. Carried by the chains 130, as shown in Figs. 3, 4, and 5, are three equally spaced stack elevating carriages 135, the latter including horizontal rods 136 which are suspended between the chains 130. Opposite ends of the rods 136 extend a short distance beyond the chains 130, as shown in Fig. 4, these ends having rollers 137 mounted thereon, the latter being adapted to be embraced by the aforedescribed inclined channels 53. Pivotally mounted on each of the rods 136 between the chains 130 and suitable collars 138 is a pair of bell cranks 140, as shown in Figs. 3 and 4. The cranks 140 have long arms 141 and shorter arms 142, the latter having rollers 143 rotatably mounted thereon as shown.

*The idle transfer conveyor 14*

Pressed into the bearings 81 of the outwardly extending bars 80 of the frame 11 are short inwardly extending stub shafts 150, upon which sprocket wheels 151 are rotatably mounted, as shown in Figs. 1 and 2. The sprockets 151 are disposed in horizontal and radial alignment with the aforementioned idle sprockets 115 of the shafts 112 and 113. Trained about the sprockets 151 and 115 is a pair of endless chains 155, as shown in Figs. 1 and 2, upper flights of the chains 155 being supported in suitable channel irons 156, the latter being supported by the upper channel bar 74 of the frame 11.

*The power driven transfer conveyor 15*

Journalled in the bearings 69 of the aforementioned angle bars 67 and 68 is a shaft 160, as shown in Figs. 2 and 5. Fixed on the shaft 160 adjacent the bearings 69 is a pair of sprocket wheels 161 and a toothed pinion 162. Pressed into the bearings 27 of the standards 20 and 21 of the frame 11 is a pair of stub shafts 163 shown clearly in Fig. 2. Rotatably mounted on the inwardly extending ends of the shafts 163 is a pair of idle sprockets 164, the latter being aligned radially with the sprockets 161 of the shaft 160. Extending inwardly from the bearings 66 of the angle iron bar 65 of the frame 11, as shown in Figs. 1 and 2, is a pair of stub shafts 165 upon which idle sprockets 166 are rotatably mounted, it being noted in Fig. 2 that the sprockets 161, 164, and 166 are disposed in radial alignment, and also that the sprockets 164 and 166 are positioned in the same horizontal plane as clearly shown in Fig. 1.

Trained about the sprockets 161, 164, and 166 is a pair of endless chains 170. Fixed at its opposite ends to the chains 170 is a horizontal bar 171, the purpose of which will be described hereinafter in connection with the operation of the machine 10. Rotatably mounted in the aforedescribed bearing 70 on the top frame member 67 is a short shaft 172 shown in Fig. 2. Fixed on opposite ends of the shaft 172 are a sprocket 173 and a gear 174, the latter being positioned so as to mesh with the aforementioned pinion 162 of the shaft 160 as shown.

*The power transmission apparatus 16*

Journalled in the bearings 49 of the angle iron bars 48 of the frame 11 is a power driven shaft 175, as shown in Figs. 1 and 2. Fixed to opposite ends of the shaft 175 are relatively small sprocket wheels 176, the latter being aligned radially with the aforementioned sprocket wheels 119 and 121 on the shafts 113 and 112, respectively. Fixed to the shaft 175 adjacent opposite ends of one of the bearings 49, as shown in Figs. 1 and 2, are a relatively small sprocket wheel 178 and large pulley wheel 179. The shaft 175 is adapted to be rotated by an endless belt 180 which is trained about a suitable pulley on the aforementioned motor 86 and the large pulley wheel 179, as shown in Fig. 1.

As shown in Figs. 1 and 2, rotation of the shaft 175 is adapted to be transmitted to the stack delivery conveyor 12 by an endless chain 185, the latter being trained about the sprocket 178 of the shaft 175 and the large sprocket 103 of the shaft 102.

Each of the shafts 112 and 113 are adapted to be driven at equal speeds by the shaft 175, it being noted that endless chains 188 are trained about the sprockets 176 of the shaft 175 and the sprockets 119 and 121 of the shafts 113 and 112, respectively, as shown in Fig. 2.

The power driven transfer conveyor 15 is driven from the shaft 112 by a chain 190, the latter being trained about the sprocket wheel 120 of the shaft 112 and the small sprocket 173 of the short shaft 172 as shown in Figs. 1 and 2.

*The separate box elevator 17*

The separate box elevator 17 includes a pair of bearing standards 205, these being suitably secured to the floor 91 as shown in Fig. 1. Journalled in the standards 205 above the floor 91 is a horizontal shaft 206 on which a pair of sprocket wheels 207 is fixed. Suitably mounted on a floor (not shown) above the floor 91 are four aligned bearings 210, as shown in Fig. 2. Rotatably mounted in the bearings 210 are shafts 211, on the inner ends of which sprockets 212 are fixed, the latter being disposed in vertical and radial alignment with the sprockets 207 of the shaft 206.

Keyed to the outer extremities of the shafts 211 are sprockets 213, these being aligned radially with the aforedescribed sprockets 118 of the shafts 112 and 113 of the machine 10. The shafts 211 are driven at equal speeds from the shafts 112 and 113 by chains 215, the latter being trained about the sprockets 118 and 213 as shown in Figs. 1 and 2.

Suitably supported between the standards 205 and bearings 210 of the elevator 200 are vertically disposed pairs of bars 216 and channel iron bars 217. Trained about the sprockets 207 of the shaft 206 and the sprockets 213 of the shafts 211 is a pair of chains 220.

Carried by the chains 220 of the elevator 200 is a plurality of equally spaced individual box carriages 221, the latter being identical in structure with the aforedescribed stack carriages 135 of the stack elevator 13.

The carriages 221 are guided by the channel iron bars 217 so that these carriages are adapted to lift boxes separately along a substantially vertical rectilinear path with the individual boxes maintained in upright position.

While no means is shown herein for taking boxes off of the elevator 17, it is to be understood that any suitable means may be provided for this purpose, such as means already in use for discharging these boxes in upright position on a horizontal conveyor in the Teague-McKevett Packing House, Santa Paula, California, or the means for removing boxes from the upper end of the elevator 17 and dumping these as shown in my copending application for U. S. Letters Patent Serial No. 453,839, filed May 19, 1930, for Automatic stack dumper.

Operation

It is clear from the foregoing description of the machine 10 that when the motor 86 is started the stack delivery conveyor 12, stack elevator 13, power driven transfer conveyor 15, and the separate box elevator 17 are all set in motion simultaneously, the direction of travel of the units 12, 13, 15, and 17 being indicated by the several arrows of Figs. 1, 5, and 6.

When this takes place the stack carriages 55 are caused to swing into and out of operative position in the following manner: Normally the bell cranks 140 of the carriages 135 hang from the rods 136 with the long arms 141 of the bell cranks disposed downwardly. However, when one of the carriages 135 starts up the inclined flights 131 of the chains 130, as shown in Fig. 8, the rollers 137 on the outer extremities of the rods 136 enter the inclined channel bars 53, and the rollers 143 on the short arms 142 of the bell cranks 140 then contact the curved portions 54 of the inclined bars 52 and the bell cranks 140 are caused to pivot about the rods 136 so that the long arms 141 are disposed in right angular relation with the flights 131 of the chains 130. As the stack carriages 135 are carried up by the inclined flights 131 of the chains 130, the long arms 141 of the cranks 140 remain in operative position until the rollers 143 of the short arms 142 roll off the upper ends of the bars, thus allowing the bell cranks 140 to swing about the rods 136 into inoperative position.

Either before or after the machine 10 is set in motion, stacks 225 of filled field boxes 226 are hand-trucked onto the stack delivery conveyor 12 so as to rest between adjacent pairs of the lugs 99. The stacks 225 are carried to the machine 10 by the conveyor 12 at a relatively slow speed and are finally rolled, one at a time, onto the stack receiving platform 55, as shown in Fig. 6.

Soon after one of the stacks 225 comes to rest on the stack receiving platform 55, one of the stack carriages 55 of the stack elevator 13 engages and tips the stack against the inclined channel bars 53, as shown in Fig. 5.

The power driven transfer conveyor 15 is timed relative to the stack elevator 13 so that immediately after a stack has been thus tipped the bar 171 of the chains 170 of the transfer conveyor 15 contacts the side of the uppermost box of the stack, thereby carrying this box along the idle conveyor 14, as shown in Fig. 5. The transfer conveyor 15 pushes the uppermost box to the end of the idle conveyor 14 in position to be picked up by one of the carriages 221 of the separate box elevator 17.

As the stack elevator 12 continues to elevate the stack 225 the boxes 226 are removed one at a time from the top of the stack by the transfer conveyor 15 and fed along the idle conveyor 14 to the separate box elevator 17. When only the last box of a stack remains on the stack elevator 13 another one of the stacks 225 is in position on the stack receiving platform 55 in readiness to be tipped as shown in Fig. 6.

It is thus seen that the machine 10 of my invention is adapted to receive a continuous supply of stacks of boxes and that the machine 10 also discharges a continuous unbroken supply of single boxes to the separate box conveyor 17.

Modification

Referring particularly to Figs. 9 to 12 inclusive, I have shown therein a modified form of unstacker 230, this machine being shown in connection with a horizontal separate box conveyor 231 and a separate box elevator 232.

The machine 230 is identical, with certain exceptions, to the aforedescribed machine 10, it being noted that like reference numerals denote like parts in each of the machines 10 and 230.

Figures 9, 10, 11, 12:
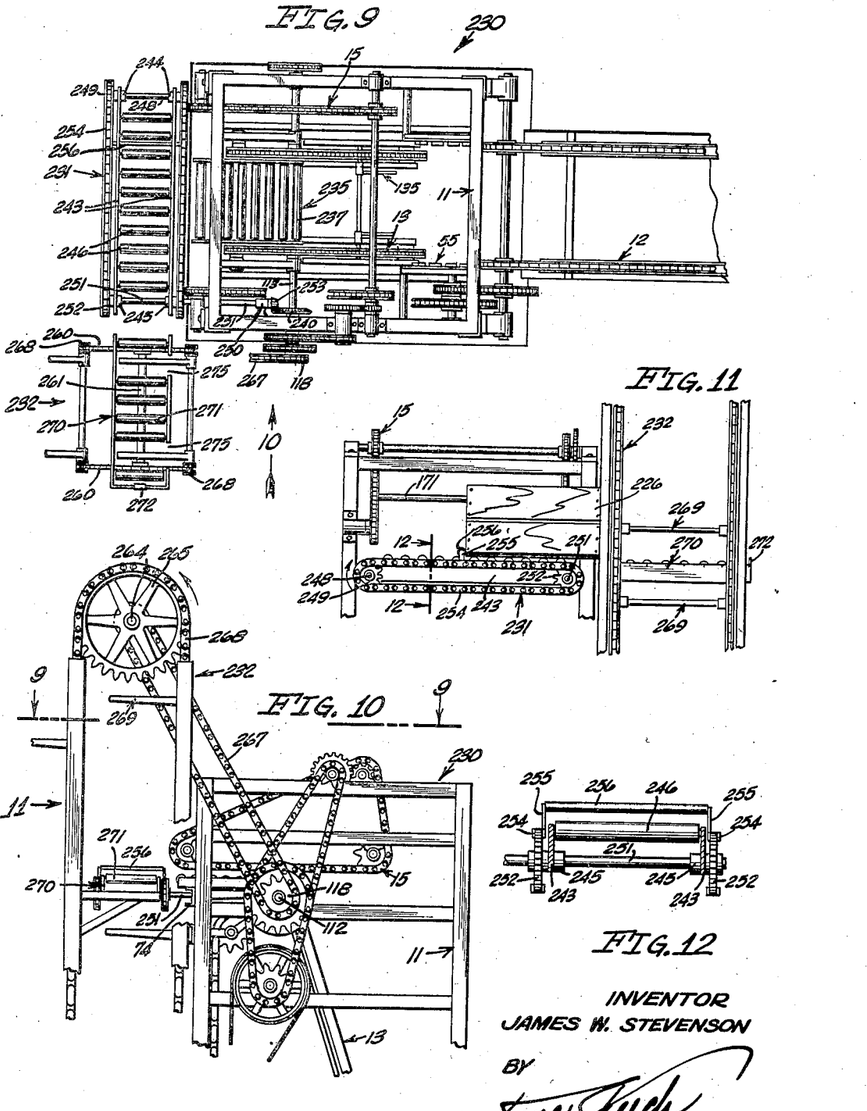
Fig. 9 is a semi-diagrammatic plan view, partly in section, of a modified form of my invention taken on the line 9—9 of Fig. 10.
Fig. 10 is a semi-diagrammatic fragmentary side elevational view of the machine shown in Fig. 9, looking in the direction of the arrow 10 of Fig. 9.
Fig. 11 is a semi-diagrammatic fragmentary elevational view of the machine shown in Figs. 9 and 10, looking in the direction of the arrow 11 of Fig. 10.
Fig. 12 is an enlarged fragmentary vertical sectional view taken on the line 12—12 of Fig. 11.

In place of the idle chain and sprocket transfer conveyor 14 used in the machine 10, the unstacker 230 has an idle roller conveyor section 235, the latter including a pair of bars 236 between which a plurality of idle rollers 237 are rotatably mounted as shown in Figs. 9 and 10.

Fixed to the shaft 112 adjacent the bearing 61 of the machine 230, as shown in Fig. 9, is a bevel gear 240 to be further described hereinafter.

The horizontal conveyor 231

The conveyor 231 includes a pair of horizontal parallel bars 243 which are suitably supported by the frame 11 of the machine 230. Mounted on opposite ends of the bars 243 are pairs of aligned bearings 244 and 245. Rotatably mounted between the bars 243 in horizontal alignment with the aforedescribed rollers 237 of the conveyor 235 is a plurality of idle rollers 246 as shown in Fig. 9.

Journalled in the bearings 244 is an idle shaft 248 upon which sprocket wheels 249 are fixed. Rotatably supported by the bearings 245 of the bars 243 and by a bearing 250 provided on the frame 11, as shown in Fig. 9, is a driven shaft 251. Fixed to the driven shaft 251 in radial alignment with the aforementioned sprockets 249 of the shaft 248 are sprockets 252. Fixed to one end of the shaft 251, as shown in Fig. 9, is a beveled pinion 253, the latter meshing with the gear 240 of the shaft 112. Trained about the sprockets 249 and 252 are chains 254, as shown in Figs. 9 and 11. Provided on the chains 254 is a pair of aligned lugs 255, the latter being adapted to support opposite ends of a transverse bar 256.

*The separate box elevator 232*

The elevator 232 shown in connection with the machine 230 is substantially identical with the "Stevenson separate box elevators" commonly used in citrus packing houses. This elevator includes a pair of lower sprocket wheels 260 fixed to a shaft 261, the latter being journalled in suitable bearings on the floor 91, as shown in Fig. 9. Journalled in suitable bearings (not shown) on a floor (not shown) above the floor 91 is a shaft 264 shown in Fig. 10. Fixed to the shaft 264 in vertical alignment with the lower sprockets 260 is a pair of sprockets 265, one of the latter being shown in Fig. 10. Also fixed on the shaft 264 is a sprocket wheel 266 which is radially aligned with the sprocket 118 on the shaft 112 of the machine 10. Trained about the sprockets 266 and 118, as shown in Fig. 10, is a chain 267 which transmits rotation of the shaft 112 to the shaft 264 of the elevator 232. Trained about the upper and lower sprocket wheels 265 and 260, respectively, are vertical chains 268, the latter carrying conventional separate box carriages 269, as shown in Figs. 9 and 10.

Suitably supported between the chains 268, as shown in Figs. 9, 10, and 11, is a separate box receiving platform 270, the latter having idle rollers 271 which are horizontally aligned with the rollers 246 of the aforedescribed conveyor 231. Provided on one end of the platform 270 is a box stop 272, as shown in Figs. 9, 10, and 11. One side of the platform 270 is formed to provide openings 275, as shown in Fig. 9, so as to allow the carriages 269 of the elevator 232 to pass upwardly through the platform 270 in a manner to be further described hereinafter.

*Operation*

When the machine 230 is set in motion the stack delivery conveyor 12, stack elevator 13, transfer conveyor 15, horizontal conveyor 231, and box elevator 232 are set in motion simultaneously and driven in proper timely relation. The machine 230 is adapted to receive stacks of boxes and elevate these stacks in identically the same manner as described in connection with the operation of the unstacker 10. The power driven transfer conveyor 15 of the machine 230 removes individual boxes from the top of a stack, as aforedescribed, these boxes being carried along the idle roller conveyor 235 and delivered, one at a time, to the horizontal conveyor 231. The conveyor 231 is properly timed so that immediately after a box is slid into position on the rollers 246, the bar 256 contacts one end of the box, as shown in Fig. 11, thus pushing the box along its longitudinal axis onto the platform 270 against the box stop 272. As the box comes to rest on the platform 270 one of the carriages 269 of the elevator 232 picks up the box and elevates it to the main floor of the packing house.

Although I have only shown and described one preferred form and one modified form of unstacker, it is to be understood that various changes and modifications might be made in these without departing from the spirit and scope of the following claims.

I claim as my invention:

1. In a machine for breaking down stacks of loaded boxes and elevating the boxes separately in upright position, the combination of: a stack elevator; endless chain means disposed vertically alongside said stack elevator; separate box supporting arms carried upon and elevated along a rectilinear path by said chain means; a horizontal track extending from the upper end of said stack elevator into said rectilinear path; endless shifting chains disposed on opposite sides of the path along which said stack is elevated; a bar connecting said shifting chains for engaging sides of the uppermost of said boxes near its bottom as said box rises between said shifting chains and shifting said box from a stack on said stack elevator onto said horizontal track and into the aforesaid rectilinear path; and means for operating said elevator, said vertical chain means, and said shifting chains in timely relation.

2. In a machine for breaking down stacks of loaded boxes and elevating the boxes separately in upright position, the combination of: an inclined stack elevator; stack supporting arms provided on said elevator; means for feeding a series of stacks to said elevator by a continuous movement bringing the lower end of the foremost stack into position to be engaged by a pair of said arms just as the last box of the preceding stack rises into position to be shifted from said elevator; endless chain means disposed vertically alongside said stack elevator; separate box supporting arms carried upon and elevated along a rectilinear path by said chain means; means for transferring boxes successively from a stack on said stack elevator into the aforesaid rectilinear path, said transfer means including a substantially horizontal conveyor extending from the upper end of said elevator into said rectilinear path and a pair of endless chains disposed on opposite sides of said conveyor, said chains carrying a bar which engages the lower portion of a box to propel this over said conveyor and transfer said box into said rectilinear path; and means for operating said stack elevator, said stack feed means, said vertical chain means, and said box transferring means in timely relation.

JAMES W. STEVENSON.